(12) United States Patent
Chen

(10) Patent No.: US 12,318,012 B2
(45) Date of Patent: Jun. 3, 2025

(54) INFLATABLE CUSHION

(71) Applicant: YIWU JINGTIAN OUTDOOR PRODUCTS CO., LTD., Yiwu (CN)

(72) Inventor: Wei Chen, Yiwu (CN)

(73) Assignee: YIWU JINGTIAN OUTDOOR PRODUCTS CO., LTD., Yiwu (CN)

( * ) Notice: Subject to any disclaimer, the term of this patent is extended or adjusted under 35 U.S.C. 154(b) by 446 days.

(21) Appl. No.: 17/813,844

(22) Filed: Jul. 20, 2022

(65) Prior Publication Data
US 2023/0148763 A1 May 18, 2023

(30) Foreign Application Priority Data
Nov. 18, 2021 (CN) .......................... 202111370219.7

(51) Int. Cl.
*A47C 27/08* (2006.01)
*A47C 27/10* (2006.01)
*B32B 3/08* (2006.01)
*B32B 5/02* (2006.01)
*B32B 5/18* (2006.01)
(Continued)

(52) U.S. Cl.
CPC ............ *A47C 27/088* (2013.01); *A47C 27/10* (2013.01); *B32B 3/08* (2013.01); *B32B 5/02* (2013.01); *B32B 5/18* (2013.01); *B32B 5/245* (2013.01); *B32B 5/26* (2013.01); *B32B 2255/02* (2013.01); *B32B 2255/26* (2013.01); *B32B 2266/00* (2013.01); *B32B 2601/00* (2013.01)

(58) Field of Classification Search
CPC ..... A47C 27/08; A47C 27/081; A47C 27/082; A47C 27/083; A47C 27/084; A47C 27/085; A47C 27/086; A47C 27/087; A47C 27/088; A47C 27/10; A47C 27/12; A47C 27/121; A47C 27/127; A47C 27/128; A47C 27/14; A47C 27/144; A47C 27/15; A47C 27/18; B32B 3/08; B32B 5/02; B32B 5/18; B32B 5/245; B32B 5/26; B32B 2255/02; B32B 2255/26; B32B 2266/00; B32B 2601/00
See application file for complete search history.

(56) References Cited

U.S. PATENT DOCUMENTS 3,042,941 A * 7/1962 Marcus .................. A47C 27/18
  5/709
4,688,283 A * 8/1987 Jacobson ............... A47C 27/10
  5/709

(Continued)

*Primary Examiner* — George Sun

(57) ABSTRACT

An inflatable cushion comprises an inflatable cushion body. The inflatable cushion body comprises a first region and a second region formed by pressing an upper and a lower fabric layers; the first region and the second region are adjacent; a cavity is arranged in the first region; a sponge is arranged in the cavity; the inflatable cushion body is provided with an air guide part for inflating and deflating the cavity; the second region is evenly provided with transverse sealing lines; the transverse sealing lines separate the second region into mutually communicated inflating cavities; and the second region is provided with a first inflating port for inflation and deflation. By arranging the first region and the second region, the sponge is arranged in the first region and the inflating cavities are arranged in the second region.

6 Claims, 5 Drawing Sheets

(51) Int. Cl.
 *B32B 5/24* (2006.01)
 *B32B 5/26* (2006.01)

(56) References Cited

U.S. PATENT DOCUMENTS

| | | | | |
|---|---|---|---|---|
| 5,412,822 | A * | 5/1995 | Kelly | A47C 4/54 |
| | | | | 5/660 |
| 5,711,041 | A * | 1/1998 | Chen | A47C 27/084 |
| | | | | 5/712 |
| 6,038,722 | A * | 3/2000 | Giori | A47C 27/18 |
| | | | | 5/709 |
| 6,219,868 | B1 * | 4/2001 | Wang | A47C 27/088 |
| | | | | 5/709 |
| 6,611,981 | B1 * | 9/2003 | Lin | A47C 27/081 |
| | | | | 5/413 AM |
| 7,583,199 | B2 * | 9/2009 | Graebe, Jr. | A47C 7/021 |
| | | | | 5/713 |
| 2005/0155154 | A1 * | 7/2005 | Kasatshko | A47C 4/54 |
| | | | | 5/713 |
| 2006/0037145 | A1 * | 2/2006 | Wang | A47C 27/084 |
| | | | | 5/709 |
| 2013/0180052 | A1 * | 7/2013 | Chen | A47C 27/082 |
| | | | | 5/711 |
| 2014/0259427 | A1 * | 9/2014 | Klink | A61G 7/05776 |
| | | | | 5/652.1 |
| 2017/0196368 | A1 * | 7/2017 | Liu | A47C 27/16 |
| 2017/0303695 | A1 * | 10/2017 | Xia | A47C 27/088 |
| 2019/0320806 | A1 * | 10/2019 | Hansen | A47C 20/021 |

\* cited by examiner

INFLATABLE CUSHION

CROSS-REFERENCE TO PRIORITY CLAIM

This application claims priority under 35 U.S.C. § 119 to Chinese Application No. 202111370219.7 filed Nov. 18, 2021. The contents of the aforementioned application are incorporated herein by reference.

TECHNICAL FIELD

The present invention relates to the technical field of inflatable cushions, and particularly to an inflatable cushion.

BACKGROUND

Because of small volume, light weight and convenience in carrying, the inflatable cushion is often used for camping or encamping. Because the interior of the existing inflatable cushion is filled with gas, the inflatable cushion is soft, but low in comfort. The interior of the existing another inflatable cushion is fully filled with sponge, and is large in volume, heavy in weight and inconvenient in carrying and storage.

SUMMARY

An embodiment of the present disclosure provides a An inflatable cushion, comprising an inflatable cushion body, wherein the inflatable cushion body comprises a first region and a second region formed by pressing an upper and a lower fabric layers; the first region and the second region are adjacent; a cavity is arranged in the first region; a sponge is arranged in the cavity; the inflatable cushion body is provided with an air guide part for inflating and deflating the cavity; the second region is evenly provided with transverse sealing lines formed by pressing; the transverse sealing lines separate the second region into mutually communicated inflating cavities; and the second region is provided with a first inflating port for inflation and deflation.

The features and functions can be achieved independently in various embodiments of the present disclosure or may be combined in yet other embodiments in which further details can be seen with reference to the following description and drawings.

Reference signs: 1 first region; 2 second region; 21 transverse sealing line; 22 first inflating port; 11 sponge; 3 air guide part; 4 third region; 41 connecting part; 42 third inflating port.

DETAILED DESCRIPTION

A technical problem to be solved by the present invention is to provide an inflatable cushion with convenience in carrying, high comfort and folding storage with respect to the problems of the prior art.

The present invention is further described below in detail in combination with the drawings and embodiments.

Embodiment 1

Figure 1:
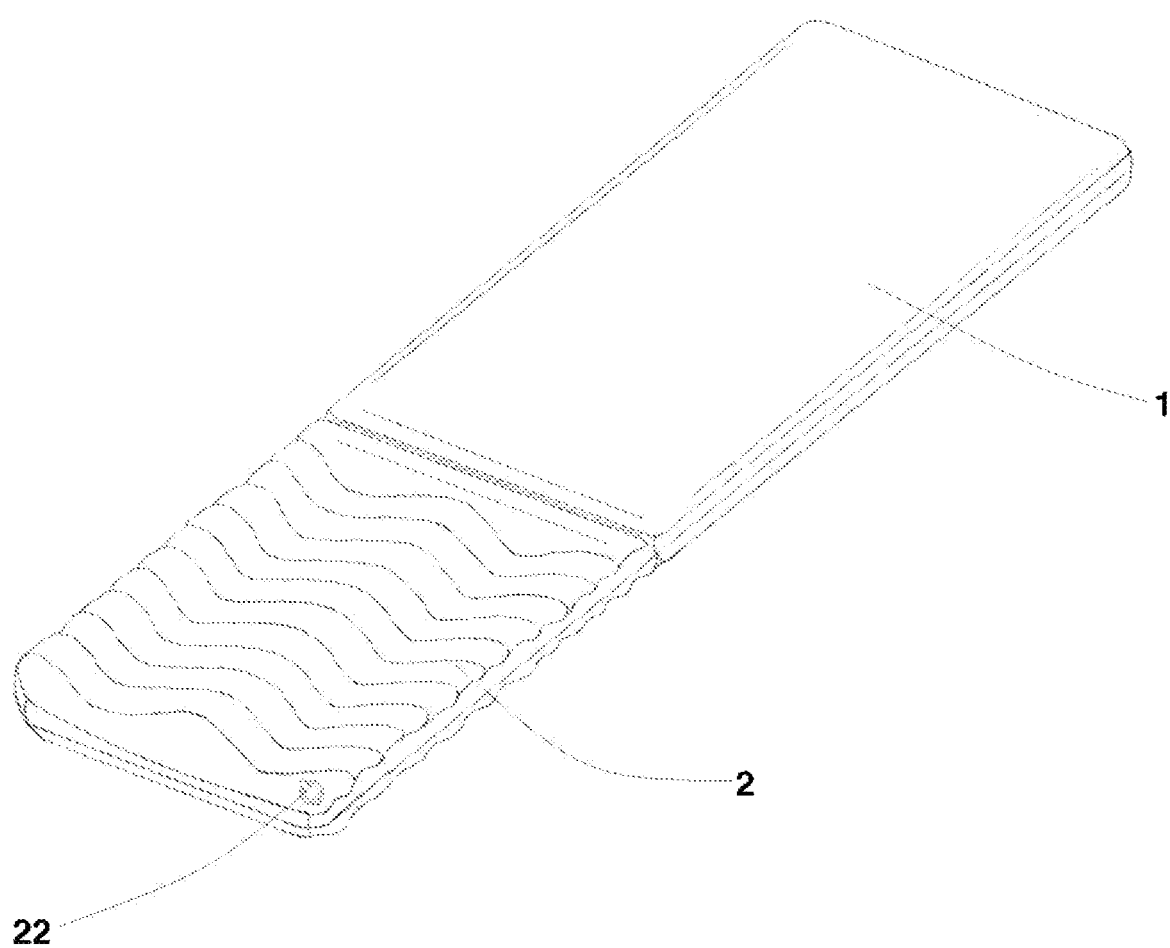
FIG. 1 is a three-dimensional schematic diagram of an embodiment 1 of an inflatable cushion in the present invention.
Figure 2:
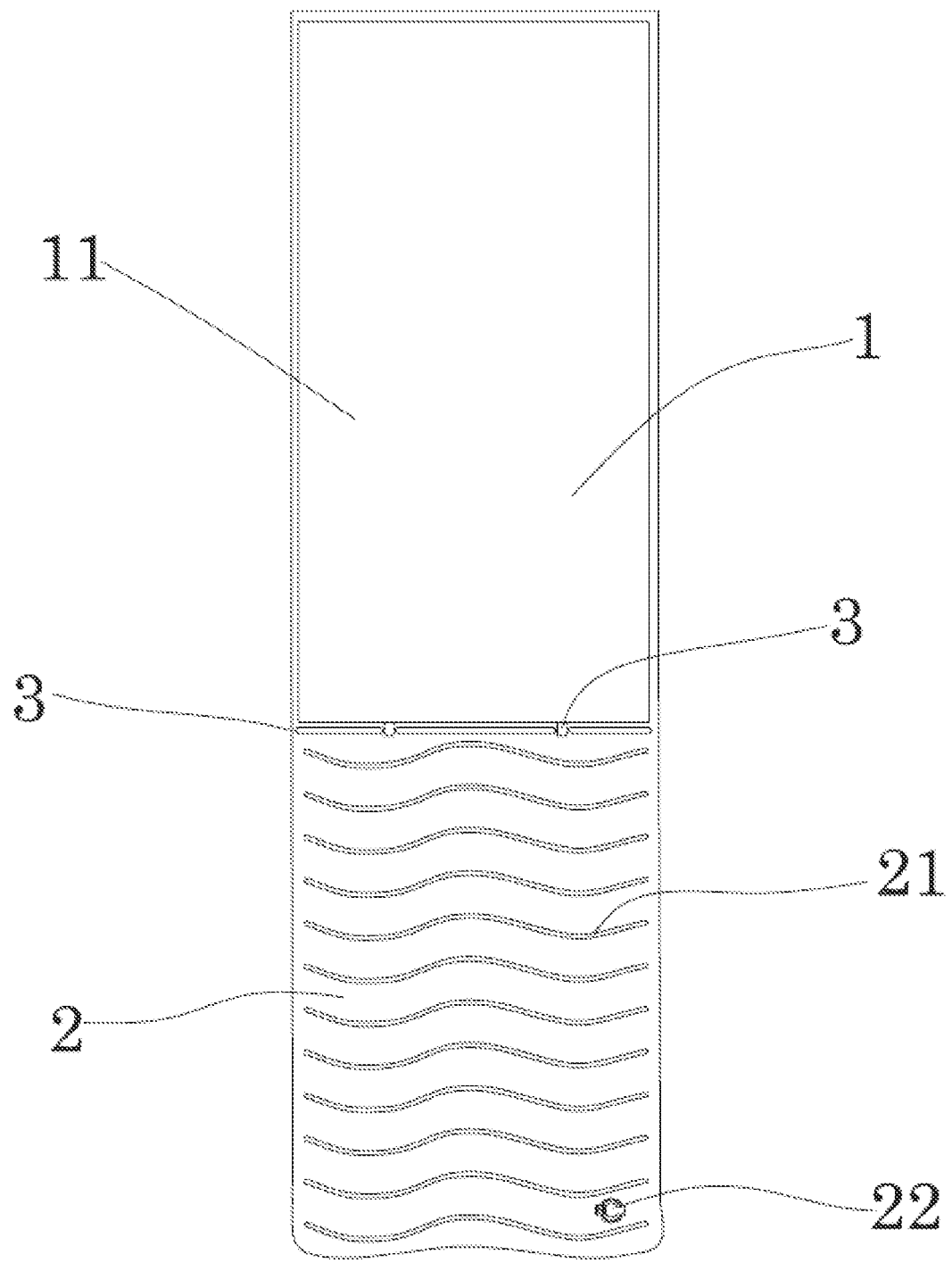
FIG. 2 is a top view of an embodiment 1 of an inflatable cushion in the present invention.

As shown in FIG. 1 to FIG. 2, an inflatable cushion comprises an inflatable cushion body. The inflatable cushion body comprises a first region 1 and a second region 2 formed by pressing an upper and a lower fabric layers. The fabric layers are TPU coated cloth. The first region 1 and the second region 2 are adjacent. A cavity is arranged in the first region 1; a sponge 11 is arranged in the cavity; the second region 2 is evenly provided with wavy transverse sealing lines 21 formed by pressing; the wavy transverse sealing lines 21 are arranged along the length direction of the inflatable cushion; and the wavy transverse sealing lines 21 separate the second region 2 into mutually communicated inflating cavities. The inflatable cushion body is provided with four air guide parts 3 used for inflating and deflating the cavity; the air guide parts are arranged between the first region 1 and the second region 2; and the air guide parts 3 are communicated with the cavity and the inflating cavities. The second region is provided with a first inflating port 22 for inflation and deflation; and the first inflating port 22 is arranged on one end of one fabric layer on the second region 2 away from the first region 1.

In use, the first inflating port 22 is used for inflating the inflatable cushion. Gas enters the first region 1 from the second region 2, and at the end of inflating, the hardness of the first region 1 is larger than the second region 2. A human body can lie on the inflatable cushion with the back resting on the first region 1 and the legs resting on the second region 2. After used in camping, the comfort of the inflatable cushion of the present invention is obviously higher than that of the traditional inflatable cushion filled with pure gas. At the same time, the first region 1 can be folded relative to the second region 2. After use, the inflatable cushion is deflated through the first inflating port 22. The volume of the first region 1 is relatively reduced, and the second region 2 is contracted and can be folded relative to the first region 1, making it convenient to carry.

Embodiment 2

Figure 3:
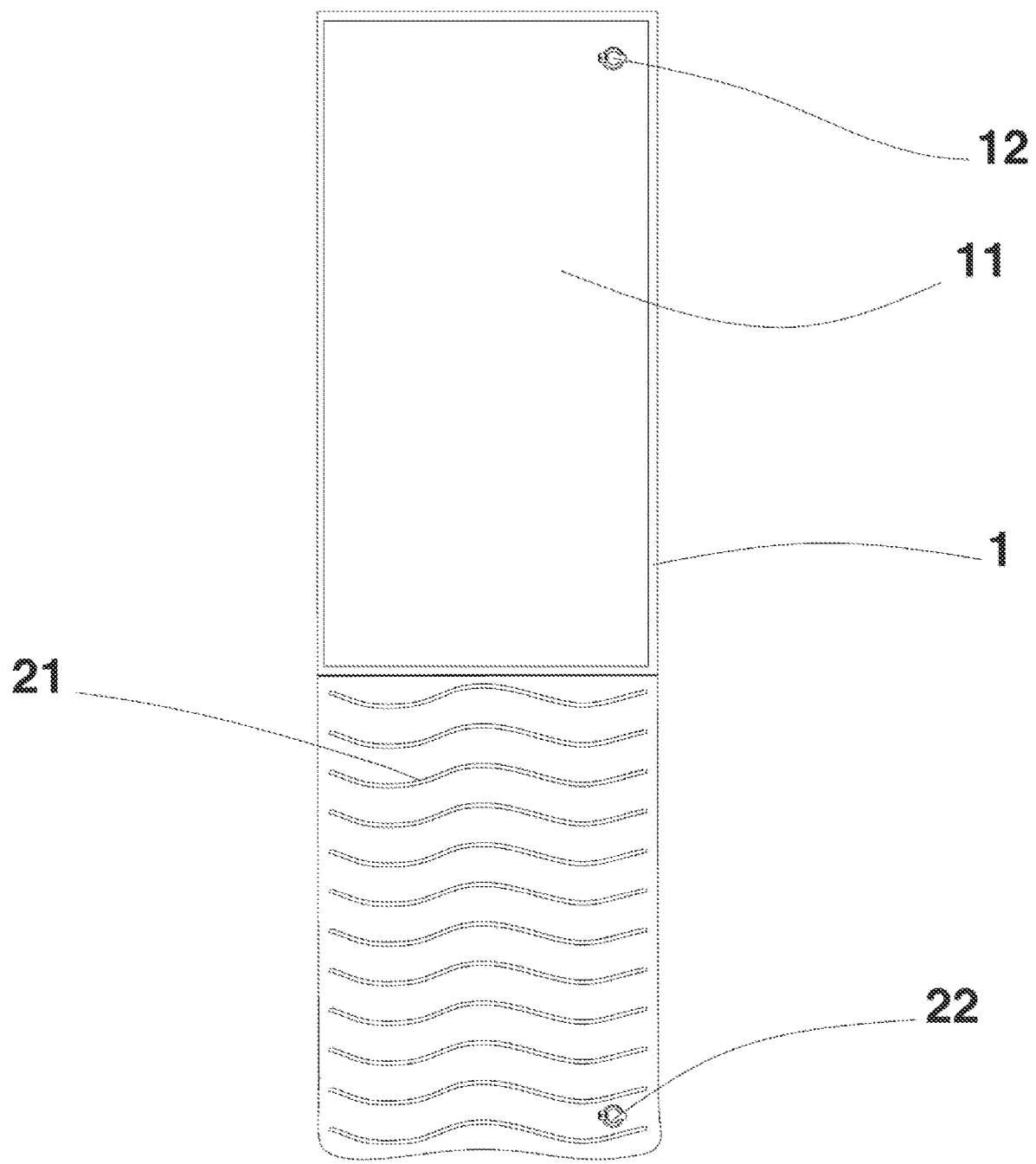
FIG. 3 is a top view of an embodiment 2 of an inflatable cushion in the present invention.

As shown in FIG. 3, an inflatable cushion comprises an inflatable cushion body. The inflatable cushion body comprises a first region 1 and a second region 2 formed by pressing an upper and a lower fabric layers. The fabric layers are TPU coated cloth. The first region 1 and the second region 2 are adjacent. The first region 1 is not communicated with the second region 2. A cavity is arranged in the first region 1. A sponge 11 is arranged in the cavity. The inflatable cushion body is provided with an air guide part used for inflating and deflating the cavity; the air guide part is a second inflating port 12; and the second inflating port 12 is located on one fabric layer on the first region 1. The second region 2 is evenly provided with transverse sealing lines 21 formed by pressing; the transverse sealing lines 21 separate the second region into mutually communicated inflating cavities; the inflating cavities are arranged along the length direction of the inflatable cushion; the ends of the inflating cavities are mutually communicated; and the second region 2 is provided with a first inflating port 22 for inflation and deflation.

In use, the first inflating port 22 is used for inflating the second region 2. Gas enters the second region 2. The second inflating port 12 is inflated. Gas enters the first region 1. After inflation, the hardness of the first region 1 is larger than the second region 2. A human body can lie on the inflatable cushion with the back resting on the first region 1 and the legs resting on the second region 2. After used in camping, the comfort of the inflatable cushion of the present invention is obviously higher than that of the traditional inflatable cushion filled with pure gas.

The first region 1 can be folded relative to the second region 2. The first region 1 and the second region 2 can also be separately inflated and used to facilitate the adjustment of the height of a seat cushion. After use, the second region 2 and the first region 1 are deflated through the first inflating port 22 and the second inflating port 12. The volume of the first region 1 is relatively reduced, and the second region 2 is contracted and can be folded relative to the first region 1, making it convenient to carry.

Embodiment 3

Figure 4:
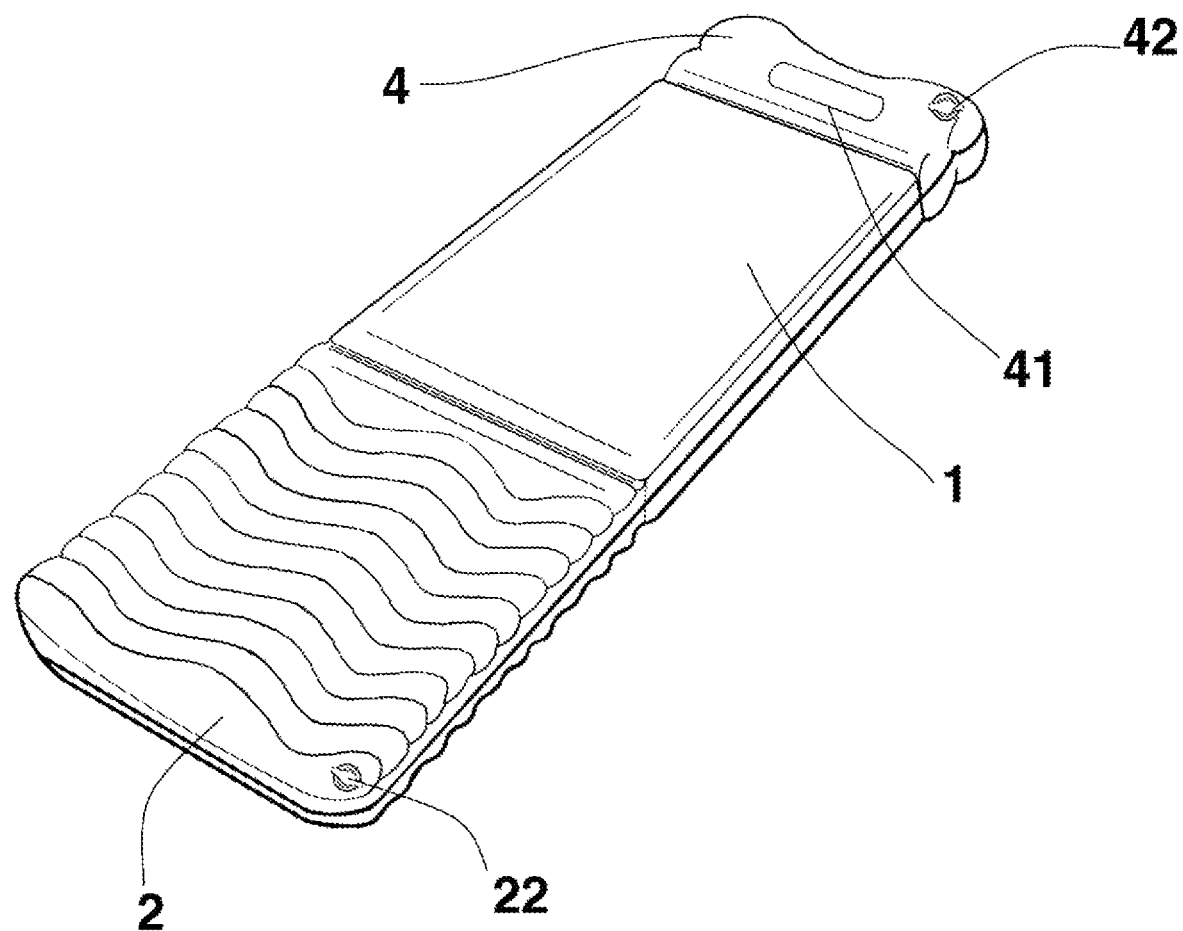
FIG. 4 is a three-dimensional schematic diagram of an embodiment 3 of an inflatable cushion in the present invention.
Figure 5:
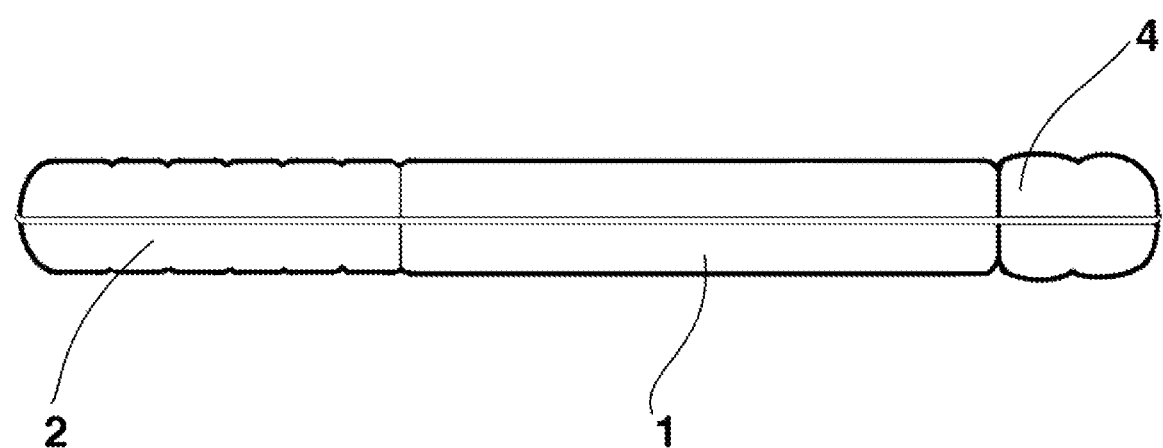
FIG. 5 is a side view of an embodiment 3 of an inflatable cushion in the present invention.
Figure 6:
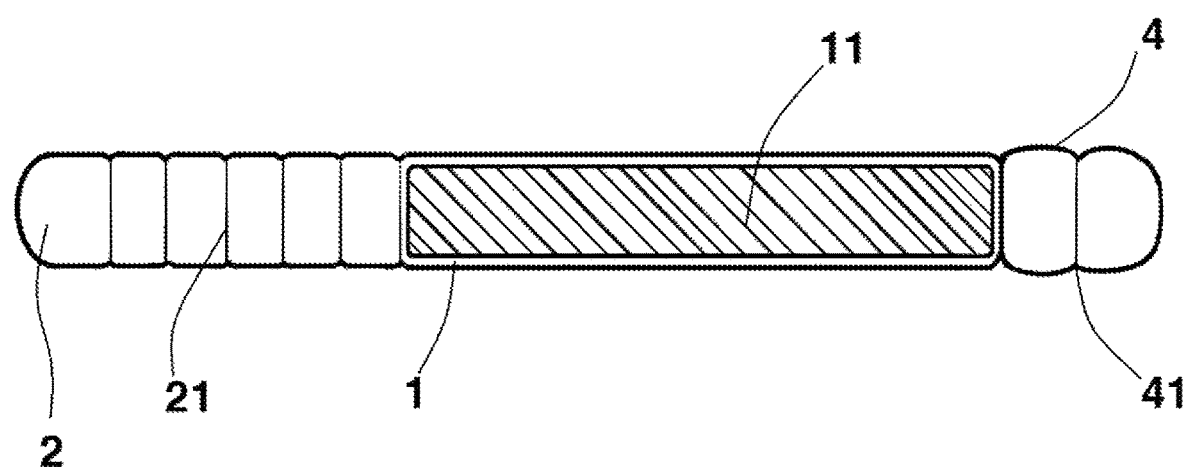
FIG. 6 is a sectional view of an embodiment 3 of an inflatable cushion in the present invention.

As shown in FIG. 4 to FIG. 6, the present embodiment is basically the same as embodiment 1, with the differences that: the present embodiment further comprises a third region 4 formed by pressing the upper and the lower fabric layers and provided with independent cavities, and the third region 4 is used as a back cushion. A connecting part 41 is arranged in the middle of the third region 4. As shown in FIG. 6, cloth is connected between the upper and the lower fabric layers of the connecting part 41, and the cloth is used to prevent the third region 4 from becoming spherical when inflating. A third inflating port 42 is connected to one fabric layer of the third region 4.

In use, the first inflating port 22 is used for inflating the second region 2. Gas enters the second region 2 and the first region 1. The third inflating port 42 is used for inflating the third region 4. Gas enters the third region 4. After inflation, the hardness of the first region 1 is larger than the second region 2 and the third region 4. A human body can lie on the inflatable cushion with the head resting on the third region 4, the back resting on the first region 1 and the legs resting on the second region 2. After used in camping, the comfort of the inflatable cushion of the present invention is obviously higher than that of the traditional inflatable cushion filled with pure gas.

The first region 1 can be folded relative to the second region 2. After use, the second region 2, the first region 1 and the third region 4 are deflated through the first inflating port 22 and the third inflating port 42. The volume of the first region 1 is relatively reduced, and the second region 2 and the third region 4 can be folded relative to the first region 1, making it convenient to carry.

Compared with the prior art, the present invention has the following beneficial effects:

By arranging the first region 1 and the second region 2, the sponge 11 is arranged in the first region 1 and the inflating cavities are arranged in the second region 2. In use, the sponge 11 can support an upper body of a user, so as to enhance the comfort of the user. The second region 2 can support the legs of the user. After deflating, the second region 2 can be retracted to reduce storage space, which is convenient to carry and light in weight.

Finally, it should be noted that the above embodiments are only used for describing the technical solutions of the present invention rather than limitation. Although the present invention is described in detail by referring to the above embodiments, those ordinary skilled in the art should understand that the technical solution recorded in each of the above embodiments can be still amended, or some technical features therein can be replaced equivalently. However, these amendments or replacements do not enable the essence of the corresponding technical solutions to depart from the spirit and the scope of the technical solutions of various embodiments of the present invention.

What is claimed is:

1. An inflatable cushion, comprising an inflatable cushion body, wherein the inflatable cushion body comprises a first region and a second region formed by pressing an upper and a lower fabric layers; the first region and the second region are adjacent; a cavity is arranged in the first region; a sponge is arranged in the cavity; the inflatable cushion body is provided with an air guide part for inflating and deflating the cavity; the second region is evenly provided with transverse sealing lines formed by pressing; the transverse sealing lines separate the second region into mutually communicated inflating cavities; and the second region is provided with a first inflating port for inflation and deflation;

the inflatable cushion further comprises a third region formed by pressing the upper and the lower fabric layer, a cavity is arranged in the third region, the third region is located on the other side of the first region relative to the second region; and the third region is used as a back cushion;

the cavity of the third region is not communicated with the cavity of the first region, and one fabric layer on the third region is provided with a third inflating port; and a cloth for connecting the upper fabric layer and the lower fabric layer is arranged in the cavity of the third region.

2. The inflatable cushion according to claim 1, wherein the air guide part is arranged between the first region and the second region; the air guide part is communicated with the cavity and the inflating cavities; and the cavity is inflated and deflated through the first inflating port.

3. The inflatable cushion according to claim 2, wherein the first inflating port is arranged on one end of one fabric layer on the second region away from the first region.

4. The inflatable cushion according to claim 1, wherein the cavity is not communicated with the inflating cavities; the air guide part is a second inflating port; and the second inflating port is located on one fabric layer on the first region.

5. The inflatable cushion according to claim 1, wherein the transverse sealing lines are wavy; the transverse sealing lines are arranged along the length direction of the inflatable cushion; and the ends of the inflating cavities are mutually communicated.

6. The inflatable cushion according to claim 1, wherein the fabric layers are TPU coated cloth.

* * * * *